(12) United States Patent
Kwan

(10) Patent No.: US 7,969,405 B2
(45) Date of Patent: Jun. 28, 2011

(54) DOUBLE-SIDED LCD PANEL

(75) Inventor: Derek Kwan, Markham (CA)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 11/780,676

(22) Filed: Jul. 20, 2007

(65) Prior Publication Data

US 2008/0088755 A1     Apr. 17, 2008

(30) Foreign Application Priority Data

Oct. 17, 2006   (CA) .................................... 2564461

(51) Int. Cl.
  *G09G 3/36*        (2006.01)
(52) U.S. Cl. ............ 345/102; 345/87; 345/204; 349/61; 349/62; 349/63; 349/86; 349/87; 349/88
(58) Field of Classification Search ............ 345/87–102, 345/204–211; 349/61–63, 86–88
  See application file for complete search history.

(56) References Cited

U.S. PATENT DOCUMENTS

| | | | |
|---|---|---|---|
| 5,296,952 A * | 3/1994 | Takatsu et al. ................... | 349/77 |
| 5,793,454 A | 8/1998 | Kawazu et al. | |
| 6,429,914 B1 * | 8/2002 | Kubota et al. ................... | 349/86 |
| 6,493,049 B2 | 12/2002 | Iwane | |
| 2003/0063456 A1 * | 4/2003 | Katahira ........................ | 362/27 |
| 2003/0112217 A1 * | 6/2003 | Lee ................................ | 345/102 |
| 2004/0017523 A1 * | 1/2004 | Asada ............................. | 349/86 |
| 2004/0070809 A1 * | 4/2004 | Senbonmatsu ............... | 359/245 |
| 2004/0183960 A1 * | 9/2004 | Kim et al. ........................ | 349/61 |
| 2005/0104823 A1 * | 5/2005 | Giraldo et al. ................... | 345/87 |
| 2005/0157224 A1 * | 7/2005 | Kanbe et al. .................... | 349/96 |
| 2005/0253789 A1 * | 11/2005 | Ikeda .............................. | 345/76 |
| 2005/0264190 A1 * | 12/2005 | Park et al. ....................... | 313/506 |

OTHER PUBLICATIONS

Fuh, et al. "A Flat Panel Display Combining a Polymer-Dispersed Liquid Crystal Film with an Electroluminescent Device", pp. 870-872, Jpn. J. Appl. Phys. vol. 33 (1994).
Amundson, Karl R. "Polymer-Dispersed Liquid-Crystal Films for Displays", pp. 65-74, Proceedings of the Conference on plastics for Portable and Wireless Electronics.
Yoshida, et al. "A Full-Color TFT-LCD with a Polymer-Dispersed Structure", pp. 417-422, Journal of the Society for Information Display, Jan. 4, 1993.
Kim, et al., "P-94: New Type of LCD with a Single Glass Substrate", pp. 574-577, SID 02 Digest.

* cited by examiner

Primary Examiner — Richard Hjerpe
Assistant Examiner — Priyank Shah
(74) Attorney, Agent, or Firm — John A. Jordan

(57) ABSTRACT

There is disclosed a double-sided liquid crystal display (LCD) panel which includes a first polymer dispersed liquid crystal (PDLC) layer configured to be responsive to an applied DC voltage for making the first PDLC layer substantially transparent; a center liquid crystal cell layer; a second PDLC layer configured to be responsive to an applied DC voltage for making the second PDLC layer substantially transparent; and an LCD control module configured to control the first and second PDLC layers such that the center liquid crystal cell layer is viewable from a selected viewing side. Depending on the selected viewing side, the LCD control module is configured to select one of the first and second PDLC layers to make substantially transparent, and the other of the first and second PDLC layers to make substantially translucent. A light source may be applied to a side of a translucent one of the PDLC layers to provide a backlight for the center liquid crystal layer.

16 Claims, 4 Drawing Sheets

DOUBLE-SIDED LCD PANEL

BACKGROUND OF THE INVENTION

1. Field of the Invention

The present invention relates to display devices, and more particularly, to liquid crystal display (LCD) panels as employed, for example, in applications that may require viewing from two sides.

2. Background and Related Art

LCD panels, some equipped with thin film transistors (TFT), have developed significantly in recent years due to their characteristic light weight, thin shape and low power consumption. Many of today's electronic devices may include LCD panels, including computer monitors, laptop computers, mobile telephones, and the like. Some of these devices may include more than one liquid crystal display LCD. For example, flip mobile phones having a closable cover may include a first LCD panel on an inner side of the cover which is viewable when the cell phone is in an open position. A second LCD panel may be provided on another part of the cell phone, such as the outer side of the closable cover that is viewable when the cell phone is in a closed position.

With current designs, while only one of the LCD panels is in use at one time, two LCD panels and their respective controllers and drivers are required. It is desirable to provide an improved LCD panel design which may reduce the need for duplication of components.

SUMMARY OF THE PRESENT INVENTION

The present invention relates to a liquid crystal display (LCD) panel viewable from at least one side through a polymer dispersed liquid crystal (PDLC) layer.

The present invention further relates to a liquid crystal display (LCD) panel that may be viewable from either side.

In an aspect of the invention, there is provided a liquid crystal display panel viewable from at least one side, comprising: a liquid crystal cell layer having at least one viewing surface; a polymer dispersed liquid crystal (PDLC) layer arranged to be responsive to an applied DC voltage for making said PDLC layer substantially transparent, positioned adjacent said at least one viewing surface of said liquid crystal cell layer; a control module arranged to control said PDLC layer to be transparent to permit viewing of one of said at least one viewing surface of said liquid crystal cell layer.

In an aspect of the invention, there is provided a double-sided liquid crystal display (LCD) panel, comprising: a first polymer dispersed crystal (PDLC) layer configured to be responsive to an applied DC voltage for making the first PDLC layer substantially transparent; a center liquid crystal cell layer; a second PDLC layer configured to be responsive to an applied DC voltage for making the second PDLC layer substantially transparent; an LCD control module configured to control the first and second PDLC layers such that the center liquid crystal cell layer is viewable from a selected viewing side.

In an embodiment, each PDLC layer has adjacent electrode plane layers configured to provide a voltage differential across the PDLC layer upon application of a DC voltage.

In another embodiment, the LCD control module is configured to select one of the first and second PDLC layers to make substantially transparent, and the other of the first and second PDLC layers to make substantially translucent.

In another embodiment, the LCD panel further comprises a light source configured to be applied to a translucent PDLC layer such that the translucent PDLC layer provides a backlight for the center liquid crystal cell layer.

In another embodiment, the LCD control module is configured to orient an image displayed on the center liquid crystal cell layer in dependence upon the selected viewing side.

In another embodiment, the LCD viewing side is automatically selected in dependence upon the configuration or orientation of a device incorporating the LCD panel.

In another embodiment, the LCD panel further comprises at least one glass or plastic substrate layer to provide structural strength or protection.

In another aspect of the invention, there is provided a method of controlling a double-sided liquid crystal display (LCD) panel, comprising: displaying an image on a center liquid crystal cell layer; controlling first and second PDLC layers provided at either side of the center liquid crystal cell layer such that the image on the center liquid crystal cell layer is viewable from a selected viewing side.

In an embodiment, the method further comprises selecting one of the first and second PDLC layers to make substantially transparent, and the other of the first and second PDLC layers to make substantially translucent.

In another embodiment, the method further comprises applying a light source to a translucent one of the PDLC layers such that the translucent PDLC layer provides a backlight for the center liquid crystal cell layer.

In another embodiment, the method further comprises orienting the image displayed on the center liquid crystal cell layer in dependence upon the selected viewing side.

In another embodiment, the method further comprises selecting the viewing side in dependence upon the configuration or orientation of a device incorporating the double-sided LCD panel.

In another aspect of the invention, there is provided a data processor readable medium storing data processor code that, when loaded into a data processing device, adapts the device to control a double-sided liquid crystal display (LCD) panel, the data processor readable medium comprising: code for displaying an image on a center liquid crystal cell layer; code for controlling first and second PDLC layers provided on either side of the center liquid crystal cell layer such that the image on the center liquid crystal cell layer is viewable from a selected viewing side.

In an embodiment, the data processor readable medium further comprises code for selecting one of the first and second PDLC layers to make substantially transparent, and the other of the first and second PDLC layers to make substantially translucent.

In another embodiment, the data processor readable medium further comprises code for applying a light source to a translucent one of the PDLC layers such that the translucent PDLC layer provides a backlight for the center liquid crystal cell layer.

In another embodiment, the data processor readable medium further comprises code for orienting the image displayed on the center liquid crystal cell layer in dependence upon the selected viewing side.

In another embodiment, the data processor readable medium further comprises code for selecting the viewing side in dependence upon the configuration or orientation of a device incorporating the double-sided LCD panel.

These and other aspects of the invention will become apparent from the following more particular description of exemplary embodiments.

BRIEF DESCRIPTION OF THE DRAWING

In the figures which illustrate exemplary embodiments of the invention.

DETAILED DESCRIPTION OF THE DRAWINGS

As noted above, the present invention relates to display devices, and more particularly to double-sided LCD panels.

Figure 1:
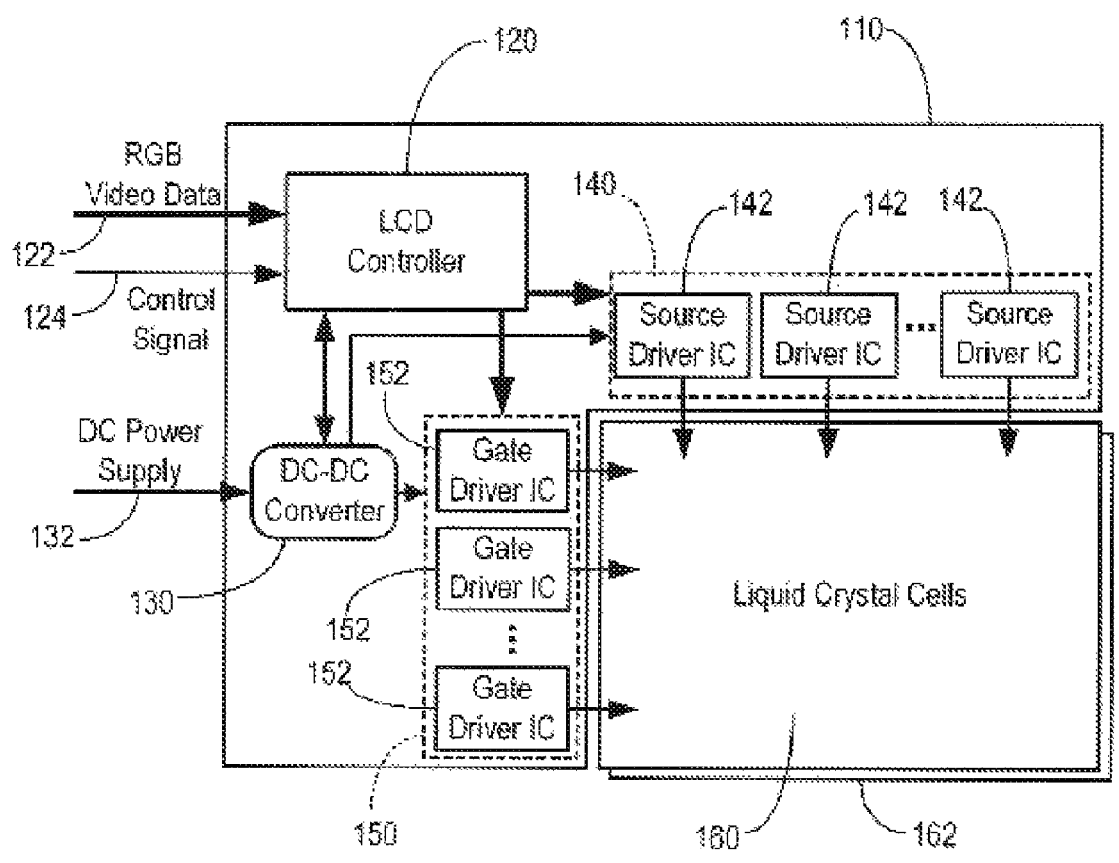
FIG. 1 is a schematic diagram of an LCD display device.

Referring to FIG. 1, shown is schematic diagram of an illustrative LCD display device 100. As shown, LCD display device 100 may include a liquid crystal cell control circuit 110, and liquid crystal cells 160.

Liquid crystal control circuit 110 may include an LCD controller 120, and a DC-DC converter 130. LCD controller 120 may be configured to receive video data input 122 (e.g. R(red), G(green) and B(blue) or RGB video data and control signal input 124. DC-DC converter 130 receives a DC power supply 132 and generates a variety of DC voltages necessary for liquid crystal control circuit 110 to function. DC power is supplied to a source driver 140 and a gate driver 150. DC power may also be supplied to a backlight layer 162 which provides backlighting to the liquid crystal cells 160. Alternatively, a reflective layer may be used instead of the backlight layer 162.

The source driver 140 and gate driver 150 may be arranged to drive a TFT array arranged in a matrix fashion on the liquid crystal cells 160. Source driver 140 may include a plurality of source driver ICs 142 arranged to supply a voltage to each of the source electrodes of TFTs arranged in a horizontal direction (X direction) in the TFT array. Gate driver 150 may include a plurality of gate driver ICs 152 arranged to supply a voltage to each of the gate electrodes arranged in a vertical direction (Y direction) in the TFT array.

Figure 2:
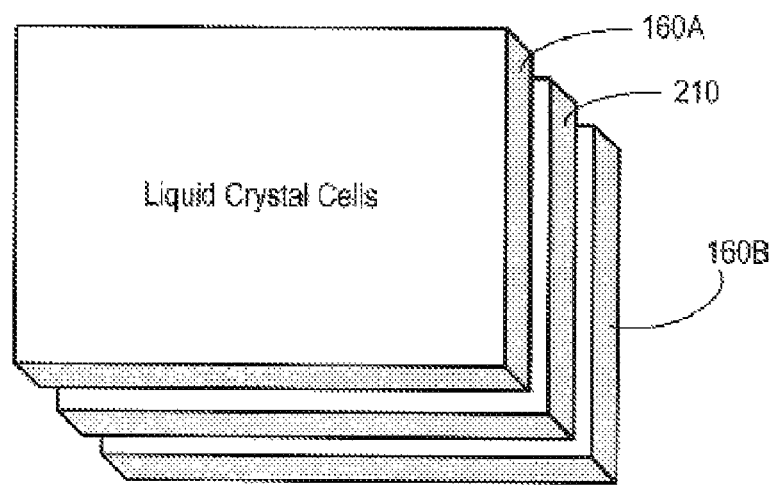
FIG. 2 is a schematic diagram of one possible double-sided LCD display.

Now referring to FIG. 2, shown is a schematic diagram of certain layers in a possible double-sided LCD display 200. As shown, double-sided LCD display 200 may include a first layer of liquid crystal cells 160A, a middle layer 210, and a second layer of liquid crystal cells 160B. The middle layer 210 of the double-sided LCD display 200 may be an electroluminescence (EL) element which may act as a backlight for both liquid crystal layers 160A and 160B. While viewable from either or both sides, this configuration would still require that there be two liquid crystal cell layers 160A and 160B, each having source drivers 140 and gate drivers 150.

In order to provide a double-sided LCD panel using only a single liquid crystal cell layer, which may be costly to manufacture, the inventor proposes the use of polymer dispersed liquid crystals (PDLCs) arranged in a double-sided, multi-layer configuration as described below.

A special property of PDLCs is that, when a direct current (DC) voltage is applied, the molecules in the PDLCs align and a PDLC layer becomes clear. When the DC voltage is removed, the molecules assume a random orientation which scatters the light and results in the PDLC layer becoming translucent. When the PDLC layer is in a translucent state, a light source, such as a white light emitting diode (LED), may be applied from an edge of the PDLC layer so that the PDLC layer, in its translucent state, may provide a backlighting effect.

As will now be explained, the special properties of PDLCs may be exploited to produce a double-sided LCD panel by placing first and second PDLC layers on either side of a central liquid crystal cell layer. The resulting double-sided LCD panel requires only one set of LCD drivers, and the cost and complexity of the LCD panel design may be reduced for double-sided applications where only one side is viewed at a time (e.g. as in a flip mobile phone, as described earlier).

In order to view the display from a first side, a DC voltage is applied to a first PDLC layer through which an LCD layer is viewed, and any DC voltage on the opposite second PDLC layer is removed. In order to flip the viewing side, the DC voltage is applied to the opposite second layer, and removed from the first PDLC layer. The LCD display image may be appropriately reversed by an LCD controller, depending on which side of the double-sided LCD panel is being viewed. This will be explained in more detail below.

Figure 3:
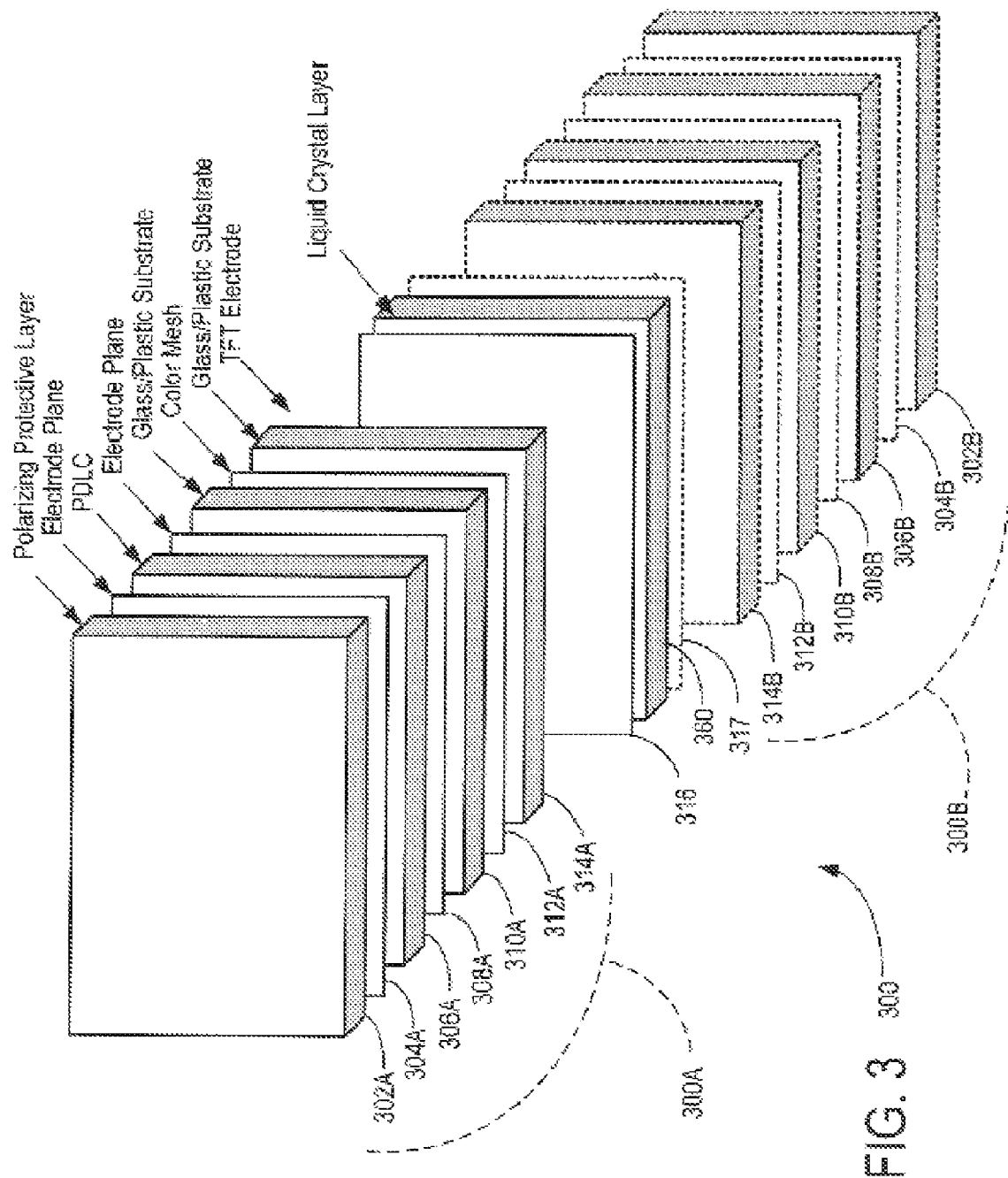
FIG. 3 is a schematic, exploded view diagram of a double-sided LCD display in accordance with an embodiment.

Now referring to FIG. 3, shown is a schematic diagram of an illustrative multilayer configuration for a double-sided LCD display 300, in accordance with an embodiment. More generally, the double-sided LCD display may have a first multilayer region 300A that may include some or all of the following layers: A polarizing protective layer 302A, a first electrode plane 304A, a PDLC layer 306A, a second electrode plane 308A, a first glass/plastic substrate 310A, a color mesh layer 312A, and a second glass/plastic substrate 314A. A center liquid crystal cell layer 360 is also shown with TFT electrode layer 316. (Optionally, layer 316 may be a non-TFT electrode layer 316 paired with another electrode layer 317).

On the other side of center liquid crystal cell layer 360, another multilayer region 300B may include the same layers as multilayer region 300A, but in reverse order (i.e. a mirror image of multilayer region 300A, with a second polarizing protective layer 302B being the furthest layer from the center liquid crystal cell layer 360).

In an alternative embodiment, if color is not necessary, the first glass/plastic substrates 310A, 310B, and the color mesh layers 312A, 312B may be omitted. As well, it will be appreciated that some of the layers provide strength and protection and are not strictly necessary to achieve an image viewable from either side of the LCD panel 300.

Figure 4:
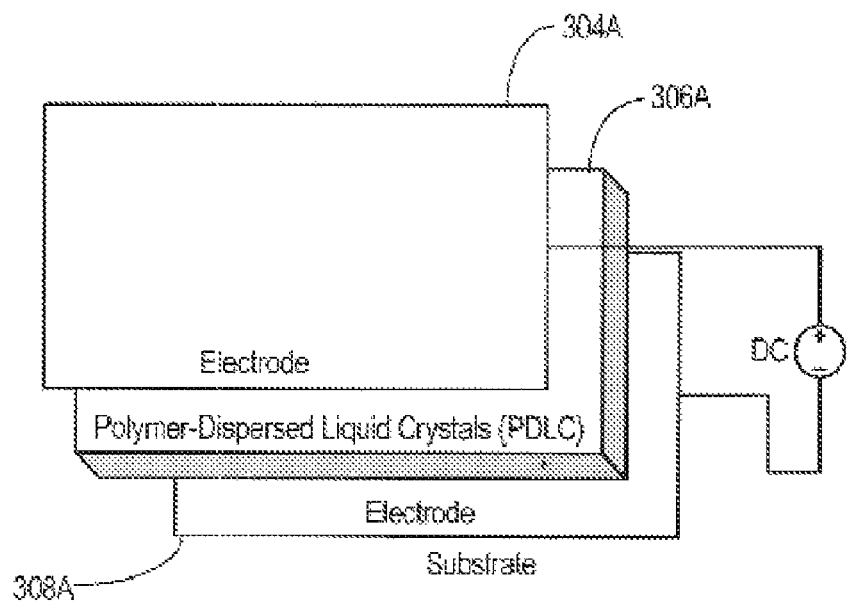
FIG. 4 shows a schematic diagram of a PDLC layer arranged between electrode planes.

Now referring to FIG. 4, shown is a schematic block diagram of an illustrative arrangement 400 of PDLC layer 306A and its nearest adjacent layers. In an embodiment, PDLC layer 306A may be placed between first and second electrode planes 304A and 308A that may be configured to accept a DC voltage input and to create a potential across PDLC layer 306A. The first and second electrode planes 304A and 308A thus may be used to control whether or not the PDLC layer 306A is clear, or is translucent as described earlier. Substrate layers (not shown) adjacent the first and second electrode planes 304A and 308A may provide structural strength and/or protection (e.g. scratches, reflections, etc.). It will be appreciated that a corresponding arrangement may be provided for PDLC layer 306B.

Figure 5:
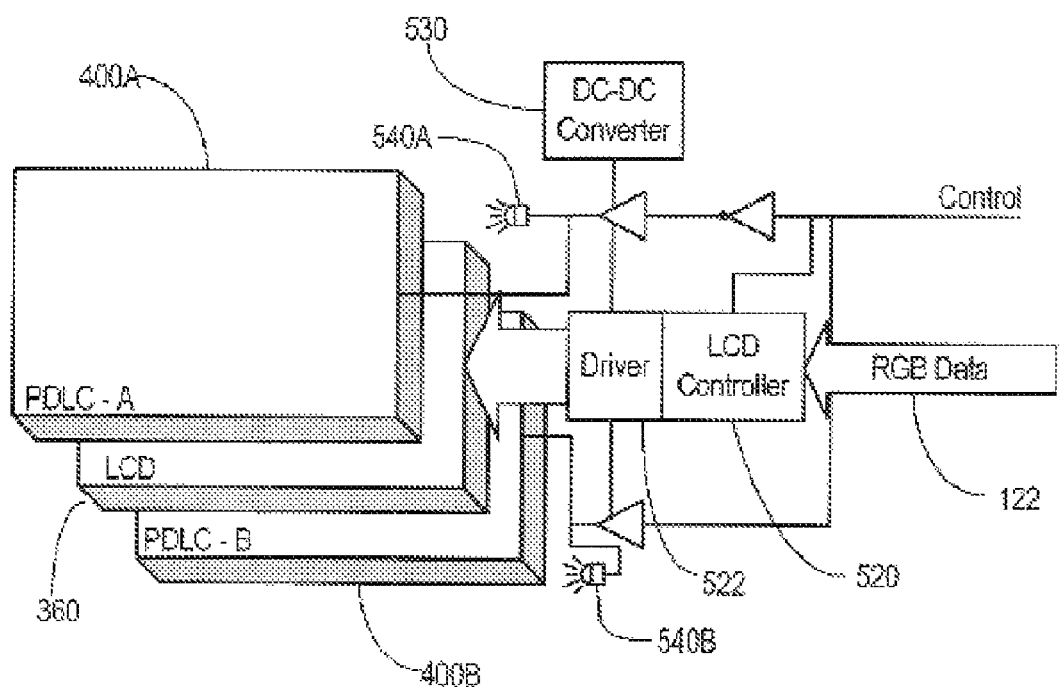
FIG. 5 shows a schematic diagram of an illustrative system for controlling a double-sided LCD panel.

Now referring to FIG. 5, shown is a schematic diagram of an illustrative control arrangement 500 for the double-sided LCD panel 300 of FIG. 3 (and as detailed in FIG. 4). As shown, an LCD controller 520 may receive RGB video data 122 and be configured to control, via a suitable driver 522, a center liquid crystal cell layer 360 to display an image corresponding to the RGB video data 122. Control signals may also be received to control the first PDLC layer 306A, and the second PDLC layer 306B via electrode layer arrangements (such as shown in FIGS. 3 and 4, and represented as PDLC layer arrangements 400A and 400B in FIG. 5). A DC-DC converter 530 may provide the various DC voltages necessary for powering the center liquid crystal cell layer 360 and for powering the electrode plates adjacent the first and second PDLC layers 306A and 306B, as shown in FIGS. 3 and 4, and represented as PDLC layer arrangements 400A and 400B in FIG. 5.

In an embodiment, the first and second PDLC layers 306A and 306B are controlled by a control signal to determine which one is transparent, and which one is translucent at any given time. That is, if a viewer is viewing the center liquid crystal cell layer 360 from side A, the first PDLC layer 306A in PDLC layer arrangement 400A will need to be transparent, and the second PDLC layer 306B in PDLC layer arrangement 400B will need to be translucent. Light source 540B may be turned on by control signals to cause the translucence in PDLC layer 306B to be illuminated to provide backlighting for liquid crystal layer 360. If the viewer is viewing the center liquid crystal cell layer 360 from side B, the second PDLC layer 306B in PDLC layer arrangement 400B will need to be transparent, and the first PDLC layer 306A in PDLC layer arrangement 400A will need to be translucent. Light source 540A may be turned on by control signals to cause the translucence in PDLC layer 306A to be illuminated to provide backlighting for liquid crystal layer 360.

If both PDLC layers are translucent, then the center liquid crystal cell layer will not be viewable from either side. If both PDLC layers are transparent, then the center liquid crystal cell layer may be viewable from both sides, but may not be readable, either because of a distracting background viewed through a substantially transparent panel, or because the image on the center liquid crystal cell layer is reversed from the viewing side. Thus, for a normal viewing operation, either one or the other of the PDLC layers (but not both) will be transparent.

Figure 6:
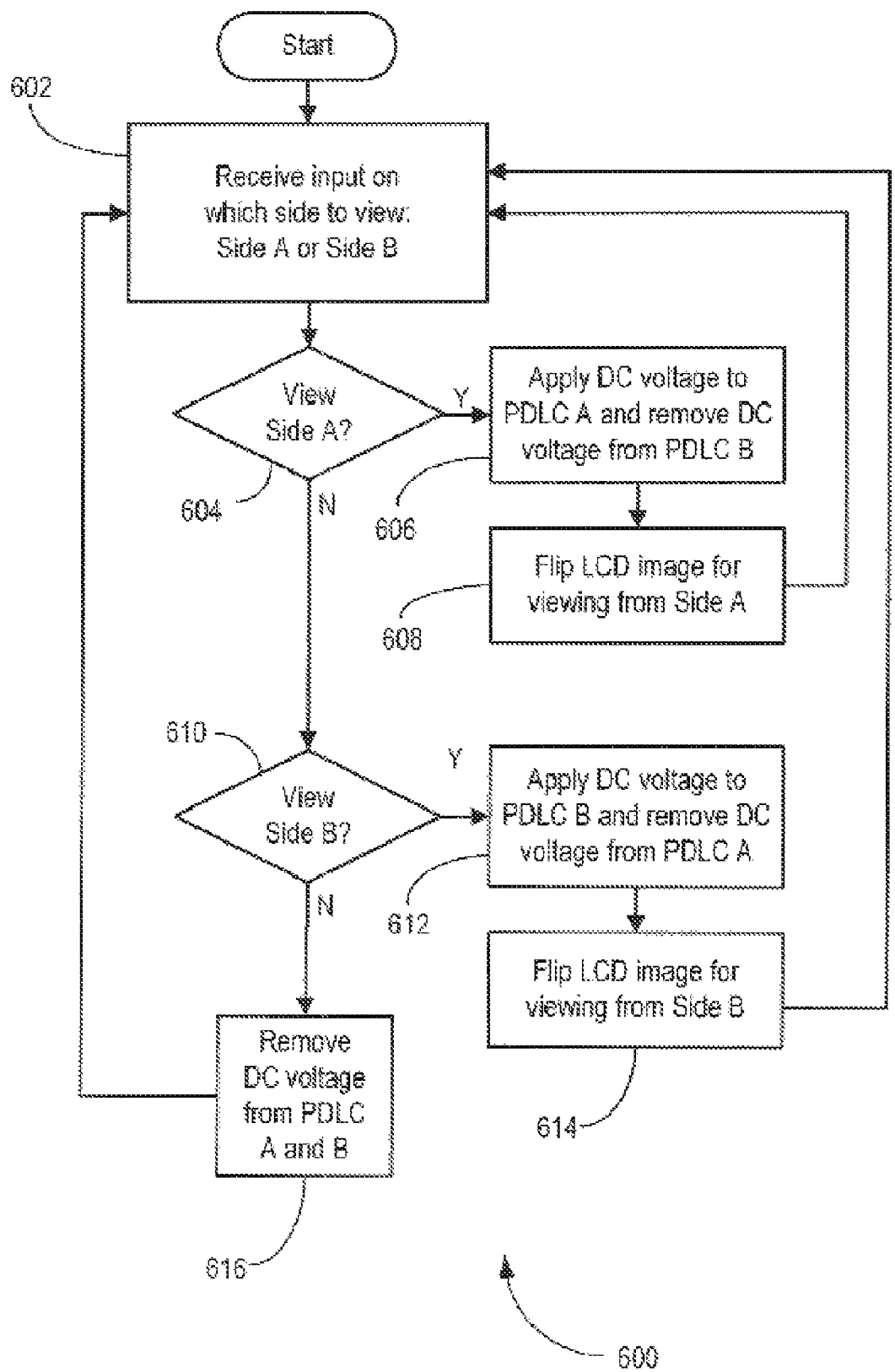
FIG. 6 is a flow chart of an illustrative method for controlling the double-sided LCD panel.

Now referring to FIG. 6, shown is a flow chart of a corresponding illustrative method 600 for controlling the double-sided LCD panel 300 of FIG. 3. Method 600 may begin and, at block 602, waits to receive a control input as to which side of the double-sided LCD panel to display. The control input may be user generated, for example, or the control signal may be automatically generated depending on a particular configuration or orientation of a device incorporating the LCD panel. For example, for a flip mobile phone, opening and closing the cover creates conditions that may be used to automatically generate control signals to determine which side of the double-sided LCD panel is displayed.

At decision block 604, method 600 may determine if a side A of LCD panel 320 is to be displayed. If yes, then method 600 proceeds to block 606 and applies a DC voltage differential across a first PDLC layer (e.g. PDLC layer 306A) in order to make this layer transparent. Any DC voltage is removed from the opposite second PDLC layer (e.g. PDLC layer 306B) in order to make that layer translucent. At block 608, the image on the LCD panel 320 may be flipped if necessary so that it is in the correct viewing orientation from side A. Method 600 then returns to block 602.

If at decision block 604, the answer is no, method 600 proceeds to decision block 610 where method 600 determines if a side B of the LCD panel 320 is to be displayed. If yes, the method 600 proceeds to block 612 and applies a DC voltage differential across the second PDLC layer (i.e. PDLC layer 306B) so that it becomes transparent. Any DC voltage differential previously applied across the first PDLC layer (i.e. PDLC layer 306A) is removed in order to make that layer translucent. At block 614, the image on the LCD panel 320 may be flipped again as necessary so that it is in the correct viewing orientation from side B. Method 600 then returns to block 602.

If at block 610, the answer is no, method 600 proceeds to block 616 where DC voltages are removed from both the first PDLC layer (i.e. PDLC layer 306A) and the second PDLC layer (i.e. PDLC layer 306B). Method 600 then returns to block 602.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A liquid crystal display panel, comprising:
   a liquid crystal cell layer having viewing surfaces on opposing sides of said layer;
   a pair of polymer dispersed liquid crystal (PDLC) layers each having a translucent state and a transparent state respectively positioned adjacent each of said viewing surfaces on opposing sides of said liquid crystal cell layer and each arranged to be responsive to an applied DC voltage for selectively making one or the other of PDLC layers substantially transparent;
   a control module arranged to selectively apply DC voltage to one or the other of said PDLC layers to make transparent and permit viewing of a selected one of said viewing surfaces on opposing sides of said liquid crystal cell layer; and
   a light source positioned at the edge of each of said PDLC layers to selectively illuminate said PDLC layers.

2. The liquid crystal display panel of claim 1, wherein said control module acts to selectively control each of said PDLC layers adjacent each of said viewing surfaces on opposing sides of said liquid crystal cell layer such that when a PDLC layer adjacent a selected viewing surface of said liquid crystal cell layer is made transparent the PDLC layer adjacent the opposing viewing surface is translucent and illuminated by said light source to backlight the selected viewing surface of said liquid crystal cell layer.

3. The liquid crystal display panel as set forth in claim 2, wherein said control module acts to provide an image on the selected one of said viewing surfaces of said liquid crystal cell layer.

4. The liquid crystal display panel as set forth in claim 3, wherein a viewing surface of said liquid crystal display cell is automatically selected in dependence upon a condition of a device incorporating the liquid crystal cell layer.

5. A double-sided liquid crystal display (LCD) panel, comprising:
   a liquid crystal cell layer having viewing surfaces on opposing viewing sides of said layer;
   a first polymer dispersed liquid crystal (PDLC) layer having a translucent state and a transparent state fixed between opposing electrode planes and positioned adjacent one of said viewing surfaces of said liquid crystal cell layer and arranged to be responsive to an applied DC voltage to said electrode planes for making said first PDLC layer substantially transparent;
   a second PDLC layer having a translucent state and a transparent state fixed between opposing electrode planes and positioned adjacent the other of said viewing surfaces of said liquid crystal cell layer and arranged to be responsive to an applied DC voltage to said electrode planes for making said second PDLC layer substantially transparent;
   a light source positioned at the edge of each of said first and second PDLC layer; and
   an LCD control module configured to selectively control the first and second PDLC layer by applying a DC voltage to the opposing electrode planes of a selected PDLC layer to make transparent such that the liquid crystal cell layer is viewable from a selected viewing side and said light source illuminates the PDLC layer in a translucent state on the opposing side to provide backlighting to the viewing side.

6. The LCD panel of claim 5, wherein the LCD control module is configured to provide an image on the selected viewing side of said liquid crystal cell layer.

7. The LCD panel of claim 6, wherein the LCD viewing side is automatically selected in dependence upon a condition of a device incorporating the LCD panel.

8. The LCD panel of claim 5, further comprising at least one glass or plastic substrate layer to provide structural strength or protection.

9. A method of making a liquid crystal display panel, comprising:
  providing a liquid crystal cell layer having viewing surfaces on opposing sides of said layer;
  providing a pair of polymer dispersed liquid crystal (PDLC) layers having a translucent state and a transparent state arranged to be responsive to an applied DC voltage for selectively making a PDLC layer substantially transparent with respective ones of said PDLC layers positioned adjacent said viewing surfaces on respective opposing sides of said liquid crystal cell layers;
  providing a light source positioned at the edge of each of said PDLC layers to selectively illuminate said PDLC layers;
  providing a control module to selectively apply DC voltage to each of said PDLC layers to cause a selected layer of said PDLC layers be transparent to permit viewing of a selected one of said viewing surfaces of opposing sides of said liquid crystal cell layer; and
  providing a control module to create images on said selected one of said viewing surfaces of said liquid crystal layer.

10. The method as set forth in claim 9, wherein said PDLC layer opposite a selected PDLC layer adjacent a selected one of said viewing surfaces of said liquid crystals cell layer is illuminated by said light source positioned at the edge of said PDLC layer opposite the selected PDLC layer to provide a backlight for said selected one of said viewing surfaces of said liquid crystal cell layer.

11. The method as set forth in claim 10, wherein said control module acts to provide an image on said selected one of said viewing surfaces of said liquid crystal cell layer using RGB video data.

12. The method as set forth in claim 11, wherein said viewing surface is automatically selected in dependence upon a condition of a device incorporating the liquid crystal cell layer.

13. A double-sided liquid crystal display (LCD) panel, comprising:
  a liquid crystal cell layer having a display surface on each of the opposing sides thereof;
  a normally translucent first polymer dispersed liquid crystal (PDLC) layer arranged to be responsive to an applied DC voltage for making said first PDLC layer substantially transparent positioned adjacent one of said opposing sides of said liquid crystal cell layer;
  a normally translucent second PDLC layer arranged to be responsive to an applied DC voltage for making said second PDLC layer substantially transparent positioned adjacent the other of said opposing sides of said liquid crystal cell layer;
  said first and second PDLC layer each having an electrode plane positioned on opposing sides thereof, a color mesh positioned between said electrode plane nearest said liquid crystal cell layer and said liquid crystal cell layer and a polarizing protective layer positioned adjacent said electrode plane farthest from said liquid crystal cell layer;
  an LCD control module configured to selectively control the first and second PDLC layers to make a selected PDLC layer transparent such that the liquid crystal cell layer is viewable from a selected viewing side; and
  a light source positioned at the edge of each of said first and second PDLC layer to illuminate the PDLC layer that is not selected to be transparent by said LCD control module.

14. The LCD panel as set forth in claim 13, wherein said LCD control module is arranged to provide an image to said selected viewing side of said liquid crystal cell layer when a selected one of said first and second PDLC layers is made substantially transparent.

15. The LCD panel of claim 14, wherein said LCD control module acts to control said light source to illuminate of said PDLC layers that is not selected and normally translucent and thereby provide a backlight for said selected viewing side of said liquid crystal cell layer.

16. A double-sided liquid crystal display (LCD) panel, comprising:
  a liquid crystal cell layer having a display surface on each of the opposing viewing sides thereof;
  a first polymer dispersed liquid crystal (PDLC) layer having a translucent state and a transparent state positioned between a pair of electrode planes to form a PDLC layer structure arranged to be responsive to an applied DC voltage for making said first PDLC layer substantially transparent and positioned adjacent one of said opposing sides of said liquid crystal cell layer;
  a second PDLC layer having a translucent state and a transparent state positioned between a pair of electrode planes to form a PDLC layer structure arranged to be responsive to an applied DC voltage for making said second PDLC layer substantially transparent and positioned adjacent the other of said opposing sides of said liquid crystal cell layer;
  a color mesh respectively positioned between each PDLC layer structure of said first and second PDLC layer structures and said liquid crystal cell layer;
  a light source positioned at the edge of each said first PDLC layer structure and said second PDLC layer structure; and
  an LCD control module arranged to selectively apply DC control voltage to said first PDLC layer structure and second PDLC layer structure to make one of said first PDLC layer structure and second PDLC layer structure selectively transparent and make said liquid crystal cell layer thereby viewable from a selected viewing side, said control module further arranged to apply drive signals to said liquid crystal cell layer to display images on said selected viewing side and apply a control signal to the light source positioned at the edge of the PDLC layer structure on the opposing side of said selected viewing side of said liquid crystal cell layer with said PDLC structure on said opposing side being translucent and providing a backlight to said transparent viewing side.

* * * * *